United States Patent
Schaub (10) Patent No.: US 7,574,392 B2
(45) Date of Patent: Aug. 11, 2009

(54) SYSTEM, METHOD AND APPARATUS FOR INVESTMENT USING A DEED OF TRUST OR MORTGAGE INSTRUMENT

(76) Inventor: Benson L. Schaub, 1525 E. Villa Theresa Dr., Phoenix, AZ (US) 85022

( * ) Notice: Subject to any disclaimer, the term of this patent is extended or adjusted under 35 U.S.C. 154(b) by 491 days.

(21) Appl. No.: 11/222,930

(22) Filed: Sep. 8, 2005

(65) Prior Publication Data

US 2006/0080204 A1  Apr. 13, 2006

Related U.S. Application Data

(60) Provisional application No. 60/607,844, filed on Sep. 8, 2004.

(51) Int. Cl.
*G06Q 40/00* (2006.01)
(52) U.S. Cl. .................. 705/36 R; 705/35
(58) Field of Classification Search ............... None
See application file for complete search history.

(56) References Cited

U.S. PATENT DOCUMENTS

| | | | | |
|---|---|---|---|---|
| 5,237,500 | A | * | 8/1993 | Perg et al. ............. 705/35 |
| 5,689,650 | A | * | 11/1997 | McClelland et al. ...... 705/36 R |
| 5,918,217 | A | * | 6/1999 | Maggioncalda et al. ... 705/36 R |
| 6,018,722 | A | * | 1/2000 | Ray et al. ............. 705/36 R |
| 2002/0133440 | A1 | * | 9/2002 | Chalke et al. ........... 705/35 |
| 2002/0152151 | A1 | * | 10/2002 | Baughman et al. ........ 705/36 |
| 2005/0278246 | A1 | * | 12/2005 | Friedman et al. ......... 705/38 |

OTHER PUBLICATIONS

William Jahnke, "Financial planning and investment management: Reality of illusion?", Journal of Financial Planning; Nov. 1999; 12, 9; p. 34 and 36-37.*
Boynton, Nancy D, "Providing advice profitably", LIMRA's MarketFacts Quarterly v22n4, Fall 2003, pp. 1-10.*
Carol L Nowka, "Laura's case: The psychology of money, the psychologist and the financial planner",Journal of Financial Planning; Jan. 2000; 13, 1; p. 100-103.*

* cited by examiner

*Primary Examiner*—Alexander Kalinowski
*Assistant Examiner*—Gregory Johnson
(74) *Attorney, Agent, or Firm*—Kunzler & McKenzie (57) ABSTRACT

A system, method and apparatus are disclosed for investment using a deed of trust or mortgage instrument. The method disclosed includes access by a certified financial professional to financial and other data on loans secured by a real estate instrument of title, evaluation of the investments, and populating the fixed income portion of a client portfolio with selected secured investments. The apparatus disclosed comprises a signal bearing medium, an electronic user interface, a financial license verification module configured to verify a government issued credential of a financial professional, a data collection module configured to access and store investment data, a secured real estate loan data base comprising listings of available interest bearing loans secured by a real estate instrument of title, and a data evaluation module configured to compare and evaluate investment possibilities.

12 Claims, 13 Drawing Sheets

INVESTMENT ADVANTAGE QUESTIONNAIRE

Client Name     Ben Schaub

Amount Invested     $1,000,000.00
Withdrawls annually     0.00%

On a scale of 1 to 10 rate the following questions.

How comfortable are you with the possibility of losing money one year in order to obtain a higher average annual retrun? (1=not willing to lose anything)     6

How important is it to receive your income or gains in the lowest possible tax rate? (1=Not important)     5

How important is it to receive growth over current income?     6

How important is it to be able to convert your investments to cash?     1

In the event of a down year in the stock market, how likely are you to hold your investments? (1=not likely, 10=very likely)     1

Total Score     19 — 1010

Recommended Allocation

| Score | Trust Deeds | Equities |
|---|---|---|
| 1 to 7 | 100% | 0% |
| 8 to 14 | 80% | 20% |
| 15 to 21 | 60% | 40% |
| 22 to 28 | 50% | 50% |
| 29 to 35 | 40% | 60% |
| 36 to 42 | 20% | 80% |
| 43 to 50 | 0% | 100% |

— 1020

Recommended Allocation     60.00%     40.00% — 1030

FIG. 10A

Investment Advantage
Trust Deed Allocation Estimates

Trust Deed Investment  $600,000.00
Annual Withdrawl %  0.00%

|  | 3 year returns | 5 yr returns | 10 year Returns |
|---|---|---|---|
| Vangaurd Total Bond Market Index Fund* | 5.35% | 6.92% | 6.56% |
| Lehman Agregate Bond Index* | 5.76% | 7.40% | 6.83% |
| Trust Deed Current Offering | 5.35% | | |

Trust Deed interest generally pays quarterly and we will assume that the withdrawls will also be taken on a quarterly basis at the end of each quarter. The interest is not reinvested into other trust deeds due to a minimum investment requirement. It is assumed that the funds are reinvested into the two bond funds. Due to the short term nture of the trust deeds, the illustration is based on a 5 year timeframe.

| Year | Quarter | Interest | Withdrawl | Ending Value | 3 year Vangaurd | 3 year Lehman |
|---|---|---|---|---|---|---|
| 2005 | 1 | 8,025.00 | 0.00 | 608,025.00 | 608,025.00 | 608,640.00 |
| 2005 | 2 | 8,132.33 | 0.00 | 616,157.33 | 616,157.33 | 617,404.42 |
| 2005 | 3 | 8,241.10 | 0.00 | 624,398.44 | 624,398.44 | 626,295.04 |
| 2005 | 4 | 8,351.33 | 0.00 | 632,749.77 | 632,749.77 | 635,313.69 |
| 2006 | 1 | 8,463.03 | 0.00 | 641,212.80 | 641,212.80 | 644,462.21 |
| 2006 | 2 | 8,576.22 | 0.00 | 649,789.02 | 649,789.02 | 653,742.46 |
| 2006 | 3 | 8,690.93 | 0.00 | 658,479.95 | 658,479.95 | 663,156.35 |
| 2006 | 4 | 8,807.17 | 0.00 | 667,287.11 | 667,287.11 | 672,705.80 |
| 2007 | 1 | 8,924.97 | 0.00 | 676,212.08 | 676,212.08 | 682,392.77 |
| 2007 | 2 | 9,044.34 | 0.00 | 685,256.42 | 685,256.42 | 692,219.22 |
| 2007 | 3 | 9,165.30 | 0.00 | 694,421.72 | 694,421.72 | 702,187.18 |
| 2007 | 4 | 9,287.89 | 0.00 | 703,709.61 | 703,709.61 | 712,298.68 |
| 2008 | 1 | 9,412.12 | 0.00 | 713,121.73 | 713,121.73 | 722,555.78 |
| 2008 | 2 | 9,538.00 | 0.00 | 722,659.73 | 722,659.73 | 732,960.58 |
| 2008 | 3 | 9,665.57 | 0.00 | 732,325.30 | 732,325.30 | 743,515.21 |
| 2008 | 4 | 9,794.85 | 0.00 | 742,120.16 | 742,120.16 | 754,221.83 |
| 2009 | 1 | 9,925.86 | 0.00 | 752,046.01 | 752,046.01 | 765,082.63 |
| 2009 | 2 | 10,058.62 | 0.00 | 762,104.63 | 762,104.63 | 776,099.82 |
| 2009 | 3 | 10,193.15 | 0.00 | 772,297.78 | 772,297.78 | 787,275.65 |
| 2009 | 4 | 10,329.48 | 0.00 | 782,627.26 | 782,627.26 | 798,612.42 |
| 2010 | 1 | 10,467.64 | 0.00 | 793,094.90 | 793,094.90 | 810,112.44 |
| 2010 | 2 | 10,607.64 | 0.00 | 803,702.54 | 803,702.54 | 821,778.06 |
| 2010 | 3 | 10,749.52 | 0.00 | 814,452.07 | 814,452.07 | 833,611.66 |
| 2010 | 4 | 10,893.30 | 0.00 | 825,345.36 | 825,345.36 | 845,615.67 |

*return information retrieved from the Vanguard website 9/7/05.
http://flagship5.vanguard.com/VGApp/hnw/FundsSnapshot?FundId=0084&FundIntExt=INT

FIG. 10B

Investment Advantage
Equity Allocation Estimates

| | |
|---|---|
| Equity nvestment | $400,000.00 |
| Annual Withdrawl % | 0.00% |

| | 3 year returns | 5 yr returns | 10 year Returns |
|---|---|---|---|
| Dow Jones Industrial Average[1] | 8.99% | 0.70% | 10.67% |
| S & P 500 Index[2] | 12.03% | -2.71% | 9.85% |
| Equity return estimate | 10.00% | | |

The returns in this illustration are based on quarterly reinvestment of the 3 year annualized return. This is for illustration purposes only and past performance does not guarantee future results. Actual returns may vary from the estimates and will fluctuate and may lose value.

| Year | Quarter | Return Estimate | Withdrawl | Ending Value | 3 year Dow Jones | 3 year S&P 500 |
|---|---|---|---|---|---|---|
| 2005 | 1 | 10,000.00 | 0.00 | 410,000.00 | 408,990.00 | 412,030.00 |
| 2005 | 2 | 10,250.00 | 0.00 | 420,250.00 | 418,182.05 | 424,421.80 |
| 2005 | 3 | 10,506.25 | 0.00 | 430,756.25 | 427,580.69 | 437,186.29 |
| 2005 | 4 | 10,768.91 | 0.00 | 441,525.16 | 437,190.57 | 450,334.67 |
| 2006 | 1 | 11,038.13 | 0.00 | 452,563.29 | 447,016.43 | 463,878.48 |
| 2006 | 2 | 11,314.08 | 0.00 | 463,877.37 | 457,063.12 | 477,829.63 |
| 2006 | 3 | 11,596.93 | 0.00 | 475,474.30 | 467,335.61 | 492,200.35 |
| 2006 | 4 | 11,886.86 | 0.00 | 487,361.16 | 477,838.98 | 507,003.28 |
| 2007 | 1 | 12,184.03 | 0.00 | 499,545.19 | 488,578.41 | 522,251.40 |
| 2007 | 2 | 12,488.63 | 0.00 | 512,033.82 | 499,559.21 | 537,958.11 |
| 2007 | 3 | 12,800.85 | 0.00 | 524,834.66 | 510,786.81 | 554,137.20 |
| 2007 | 4 | 13,120.87 | 0.00 | 537,955.53 | 522,266.74 | 570,802.88 |
| 2008 | 1 | 13,448.89 | 0.00 | 551,404.42 | 534,004.68 | 587,969.78 |
| 2008 | 2 | 13,785.11 | 0.00 | 565,189.53 | 546,006.44 | 605,652.97 |
| 2008 | 3 | 14,129.74 | 0.00 | 579,319.27 | 558,277.93 | 623,867.98 |
| 2008 | 4 | 14,482.98 | 0.00 | 593,802.25 | 570,825.23 | 642,630.81 |
| 2009 | 1 | 14,845.06 | 0.00 | 608,647.30 | 583,654.53 | 661,957.93 |
| 2009 | 2 | 15,216.18 | 0.00 | 623,863.49 | 596,772.16 | 681,866.31 |
| 2009 | 3 | 15,596.59 | 0.00 | 639,460.07 | 610,184.62 | 702,373.44 |
| 2009 | 4 | 15,986.50 | 0.00 | 655,446.58 | 623,898.52 | 723,497.33 |
| 2010 | 1 | 16,386.16 | 0.00 | 671,832.74 | 637,920.64 | 745,256.51 |
| 2010 | 2 | 16,795.82 | 0.00 | 688,628.56 | 652,257.90 | 767,670.10 |
| 2010 | 3 | 17,215.71 | 0.00 | 705,844.27 | 666,917.40 | 790,757.78 |
| 2010 | 4 | 17,646.11 | 0.00 | 723,490.38 | 681,906.37 | 814,539.82 |

1 return information retrieved from DowJones.com
2 return information retrieved from Standardandpoors.com

FIG. 10C

Investment Advantage

Combined Expectations Values

| Year | Quarter | Income Advantage | V.-Total Bond Dow Jones | V.-Total Bond S&P 500 | Leh Agg Bond Dow Jones | Leh Agg Bond S&P 500 |
|---|---|---|---|---|---|---|
| 2005 | 1 | 1,018,025.00 | 1,017,015.00 | 1,020,055.00 | 1,017,630.00 | 1,020,670.00 |
| 2005 | 2 | 1,036,407.33 | 1,034,339.38 | 1,040,579.14 | 1,035,586.47 | 1,041,826.22 |
| 2005 | 3 | 1,055,154.69 | 1,051,979.13 | 1,061,584.73 | 1,053,875.73 | 1,063,481.33 |
| 2005 | 4 | 1,074,274.92 | 1,069,940.34 | 1,083,084.43 | 1,072,504.26 | 1,085,648.35 |
| 2006 | 1 | 1,093,776.08 | 1,088,229.22 | 1,105,091.28 | 1,091,478.63 | 1,108,340.69 |
| 2006 | 2 | 1,113,666.38 | 1,106,852.14 | 1,127,618.64 | 1,110,805.58 | 1,131,572.09 |
| 2006 | 3 | 1,133,954.25 | 1,125,815.56 | 1,150,680.30 | 1,130,491.97 | 1,155,356.70 |
| 2006 | 4 | 1,154,648.27 | 1,145,126.10 | 1,174,290.39 | 1,150,544.79 | 1,179,709.08 |
| 2007 | 1 | 1,175,757.27 | 1,164,790.49 | 1,198,463.48 | 1,170,971.18 | 1,204,644.17 |
| 2007 | 2 | 1,197,290.23 | 1,184,815.63 | 1,223,214.53 | 1,191,778.44 | 1,230,177.34 |
| 2007 | 3 | 1,219,256.38 | 1,205,208.53 | 1,248,558.92 | 1,212,973.99 | 1,256,324.38 |
| 2007 | 4 | 1,241,665.14 | 1,225,976.35 | 1,274,512.49 | 1,234,565.41 | 1,283,101.55 |
| 2008 | 1 | 1,264,526.15 | 1,247,126.41 | 1,301,091.50 | 1,256,560.46 | 1,310,525.55 |
| 2008 | 2 | 1,287,849.26 | 1,268,666.17 | 1,328,312.70 | 1,278,967.02 | 1,338,613.55 |
| 2008 | 3 | 1,311,644.57 | 1,290,603.24 | 1,356,193.28 | 1,301,793.15 | 1,367,383.19 |
| 2008 | 4 | 1,335,922.40 | 1,312,945.39 | 1,384,750.96 | 1,325,047.06 | 1,396,852.64 |
| 2009 | 1 | 1,360,693.32 | 1,335,700.54 | 1,414,003.94 | 1,348,737.15 | 1,427,040.56 |
| 2009 | 2 | 1,385,968.11 | 1,358,876.79 | 1,443,970.94 | 1,372,871.98 | 1,457,966.13 |
| 2009 | 3 | 1,411,757.85 | 1,382,482.39 | 1,474,671.22 | 1,397,460.27 | 1,489,649.10 |
| 2009 | 4 | 1,438,073.84 | 1,406,525.78 | 1,506,124.59 | 1,422,510.94 | 1,522,109.75 |
| 2010 | 1 | 1,464,927.64 | 1,431,015.54 | 1,538,351.41 | 1,448,033.08 | 1,555,368.95 |
| 2010 | 2 | 1,492,331.10 | 1,455,960.45 | 1,571,372.64 | 1,474,035.96 | 1,589,448.16 |
| 2010 | 3 | 1,520,296.34 | 1,481,369.46 | 1,605,209.84 | 1,500,529.06 | 1,624,369.44 |
| 2010 | 4 | 1,548,835.74 | 1,507,251.73 | 1,639,885.18 | 1,527,522.04 | 1,660,155.49 |
| Performance vs. Investment Advantage | | | -2.76% | 5.55% | -1.40% | 6.71% |
| Annualized difference | | | -0.55% | 1.11% | -0.28% | 1.34% |

FIG. 10D

SYSTEM, METHOD AND APPARATUS FOR INVESTMENT USING A DEED OF TRUST OR MORTGAGE INSTRUMENT

CROSS REFERENCES TO RELATED APPLICATIONS

This application is a continuation-in-part of and claims priority to U.S. Provisional Patent Application No. 60/607,844 entitled "Investment Method Using Deed of Trust or Mortgage Instrument" and filed on Sep. 8, 2004 for Benson L. Schaub, which is incorporated herein by reference.

BACKGROUND OF THE INVENTION

Field of the Invention

The present state of art relates to the investment management of funds under contract that is customarily conducted by a registered investment advisor or a properly licensed money manager. The method of investment management currently in use typically divides a portfolio between fixed income and equities, with the fixed income investments being bonds, bond funds, utilities, CDs, Treasuries, and other traditional fixed income instruments.

The embodiment of the new invention replaces or supplements the traditional fixed income allocation of investments used by investment advisors and money managers with short-term (1 to 3 year), high-yield loans, secured by first (occasionally second) position mortgages on real estate. These mortgage loans are called "deed of trust" investments. Deed of trust or mortgage instrument investments have traditionally been made through a state licensed mortgage broker. The embodiment of the present invention, however, adds deeds of trust to the investments offered to clients of a federally registered investment advisor or money manager.

SUMMARY OF THE INVENTION

The new investment method of the embodiment of the present invention can allocate any percentage of the fixed income portion of the investment account or portfolio into these deed of trust investments. A further embodiment may include an equity allocation of any percentage of the investment account. The equity allocation can be managed in any of the current methods of selecting and managing equity investments. The apparatus is designed to electronically implement the investment method.

The equity allocation and fixed income allocation of a managed account or portfolio may vary according to the style of the investment advisor or money manager. There may also be other allocations other than equity or fixed income. The number or type of asset allocations does not affect the novelty of this new invention or investment method. Under the present invention, some percentage of allocation of fixed income investment will be comprised of short-term (1 to 3 year), high-yield loans, secured by first (occasionally second) position mortgages on real estate.

In a further embodiment, the deed of trust or mortgage instrument investments may be made through the involvement of a state licensed mortgage broker, as is required by law in some states. The investment method of the present invention may also be administered through the apparatus of the present invention, with another custom designed program, or with a modified form of an existing financial program such as Quicken, money, or Peach Tree. Furthermore, this new investment method may employ a software program that grades the quality of the loans used for fixed income investments. Additionally, the stocks or equity investments, or other asset allocation investments, to be purchased may be evaluated with the use of a computer program.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, specific details are provided. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Deed of trust or mortgage instruments have traditionally been the purview of the state licensed mortgage broker, while the federally registered investment advisor or money manager relied on bonds, bond funds, utilities, CDs, and Treasuries as fixed-income investment vehicles. These investments, however, while secure, are typically relatively lower yield than equity type investments while being subject to a higher rate of taxation. This limitation has been a source of loss and frustration to individuals and organizations who either desire or are legally compelled to employ low-risk investment vehicles.

Deed of trust investments, however, particularly short-term loans secured by property, can be comparatively very secure and productive for fixed income type investments. Interest earned on a deed of trust can be expected to equal or surpass the average yield on even carefully selected equity investments. Furthermore, the value of deed of trust investments is secured by actual property at typically no more than a 70% loan to value ratio. Therefore, the rare default actually improves the position of the investor, who receives 100% of the value of the secured property, giving the investor a 30% increase over the value of the loan. All of these factors make the deed of trust and mortgage instrument investments of the present invention particularly appropriate as investment vehicles for client portfolio funds. The present invention makes these investment vehicles available to the clients of federally registered investment advisors and money managers.

Figure 1:
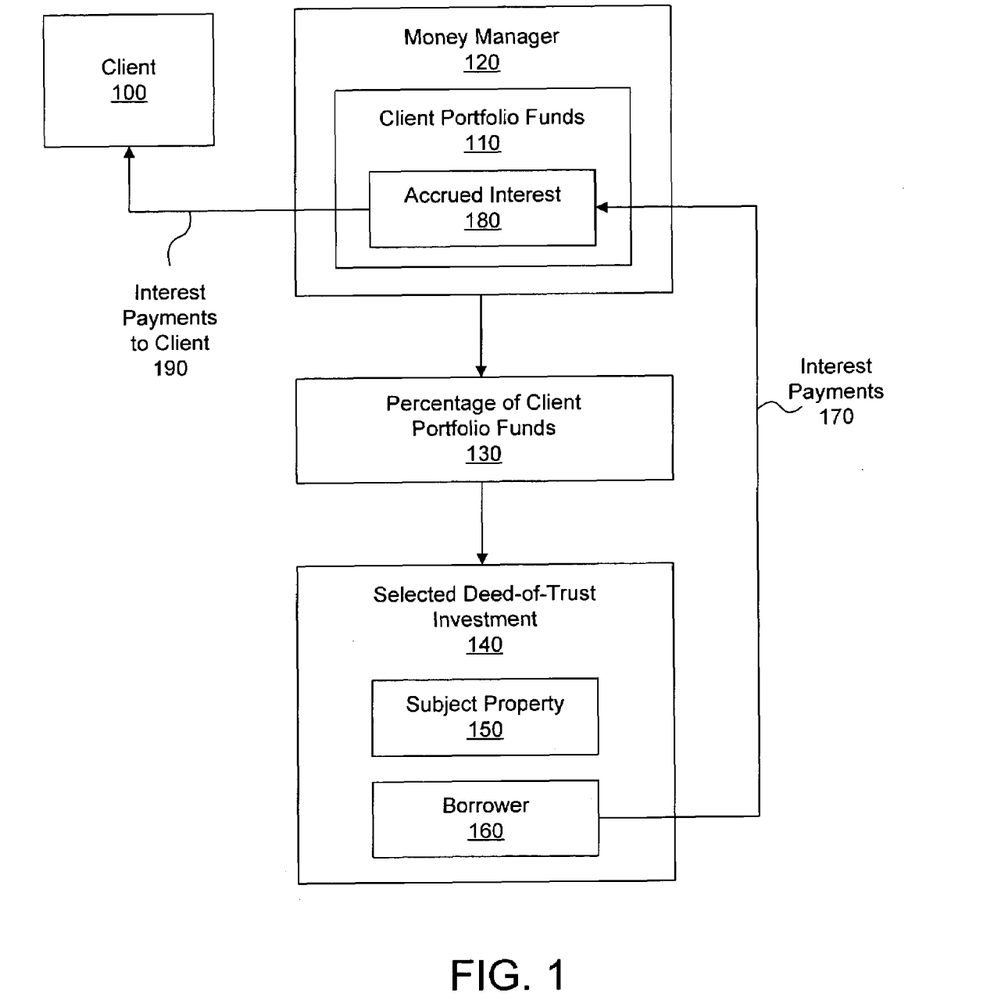
FIG. 1 is a schematic block diagram depicting one embodiment of the proprietary Fixed Income Advantage method.

FIG. 1 is a schematic block diagram depicting one embodiment of the proprietary Fixed Income Advantage method. A client 100 deposits portfolio funds 110 with a Registered money manager 120. The money manager 120 invests a percentage of the client portfolio funds 130 in a selected deed of trust investment 140, comprising a subject property 150 and a borrower 160. The borrower 160 makes interest payments 170 to accrued interest 180 within the client portfolio funds 110. A percentage of between zero and 100% of the accrued interest is paid out to the client 100 as interest payment 190.

Figure 2:
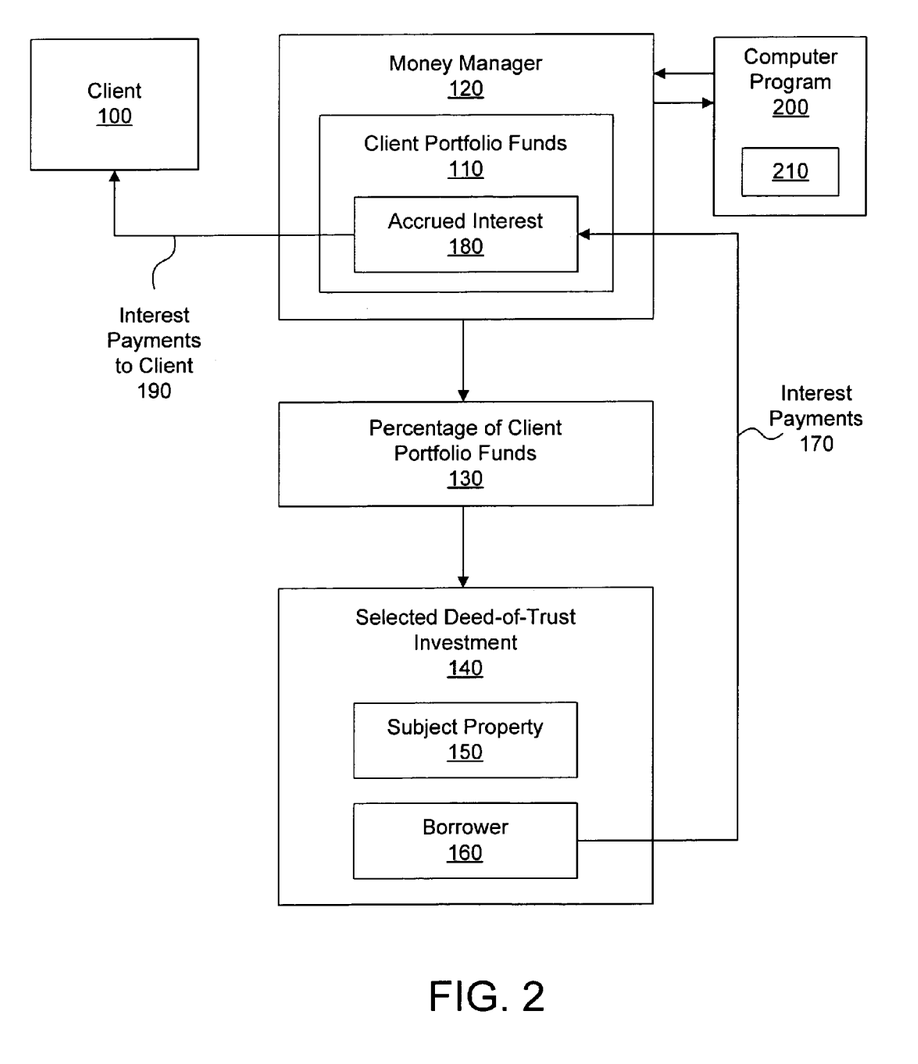
FIG. 2 is a schematic block diagram depicting one embodiment of a method for using a computer program to grade and evaluate stocks.

FIG. 2 is a schematic block diagram depicting one embodiment of a method for the use of a computer program in evaluating and grading mortgage instruments for use in the Fixed Income Advantage method. The client 100 deposits portfolio funds 110 with the Registered money manager 120. The money manager 120 uses a computer program 200 in evaluating and grading potential deed of trust investments 210. The money manager 120 then invests a percentage of the client portfolio funds 130 in a selected deed-of-trust investment 140, comprising the subject property 150 and the borrower 160. The borrower 160 makes interest payments 170 which accumulate at accrued interest 180 within the client portfolio funds 110. The client 100 receives interest payments of from zero to 100% of the accrued interest 180.

Figure 3:
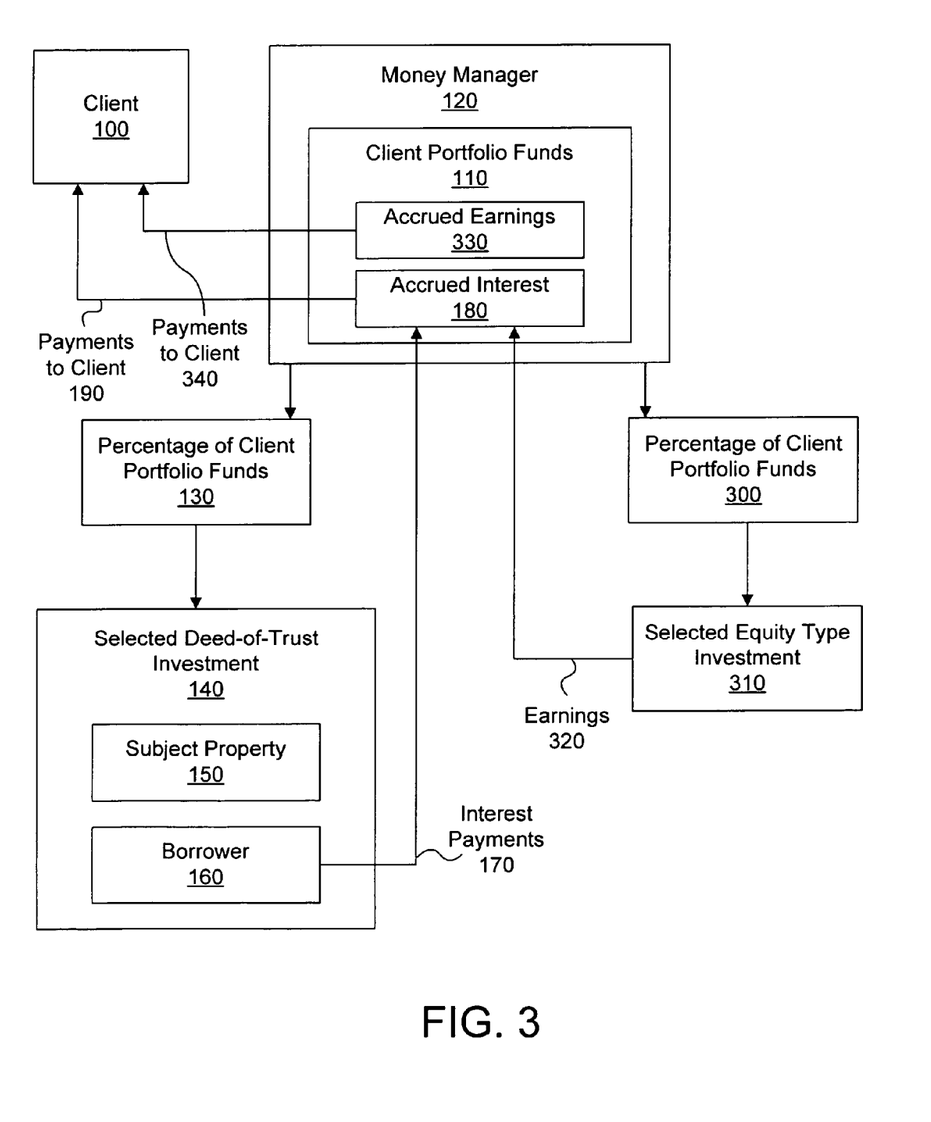
FIG. 3 is a schematic block diagram depicting one embodiment of a method for combination of the Fixed Income Advantage method with equity type investments.

FIG. 3 is a schematic block diagram depicting one embodiment of a method for the combination of the Fixed Income Advantage method with equity type investments. The client 100 deposits portfolio funds 110 with the money manager 120. The money manager 120 invests a percentage of the client portfolio funds 130 in selected deed of trust investments 140, comprising the subject property 150 and the borrower 160. The borrower 160 makes interest payments 170 to accrued interest 180 within the client portfolio funds 110. The client 100 receives payments 190 from the accrued interest 180. The money manager 120 also invests a percentage of client portfolio funds 300 in a selected equity type investment 310. Earnings 320 are paid into accrued earnings 330. The client receives payments 340 from the accrued earnings 330.

Figure 4:
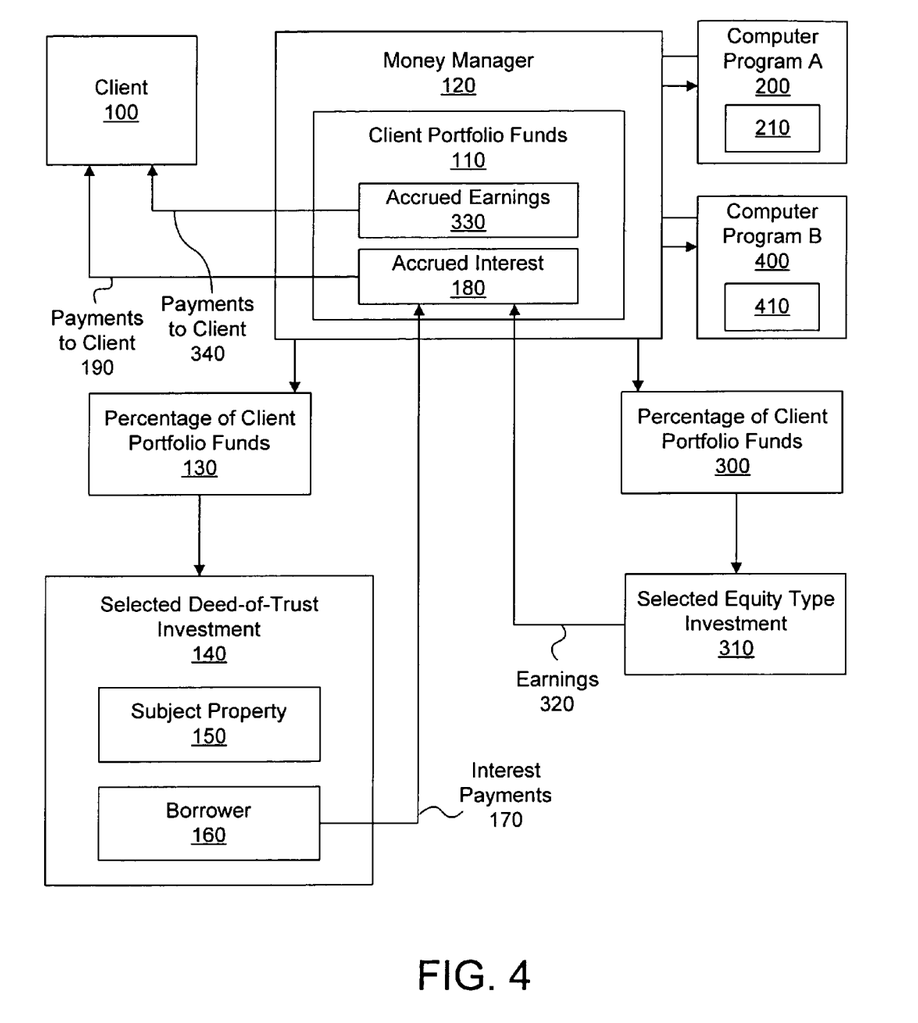
FIG. 4 is a schematic block diagram depicting one embodiment of a method for using a computer program to evaluate and grade indexed stocks and managed funds for use in combination with the Fixed Income Advantage method.

FIG. 4 is a schematic block diagram depicting one embodiment of a method for employing computer programs to grade and evaluate mortgage instruments and indexed stocks and managed funds for use in combination. The client 100 deposits the client portfolio funds 110 with the money manager 120. The money manager 120 employs computer program 200 to evaluate and grade potential deed of trust investments 210 and computer program 400 to evaluate and grade potential equity type investment stocks and managed funds 410. The money manager 120 then invests a percentage of the client portfolio funds 130 in selected deed of trust investments 140, comprising the subject property 150 and the borrower 160. The borrower 160 makes interest payments 170 to accrued interest 180 within the client portfolio funds 110. The client 100 receives payments 190 from the accrued interest 180. The money manager 120 also invests a percentage of the client portfolio funds 300 in a selected equity type investment 310. Earnings 320 are paid into accrued earnings 330. The client receives payments 340 from the accrued earnings 330.

Figure 5:
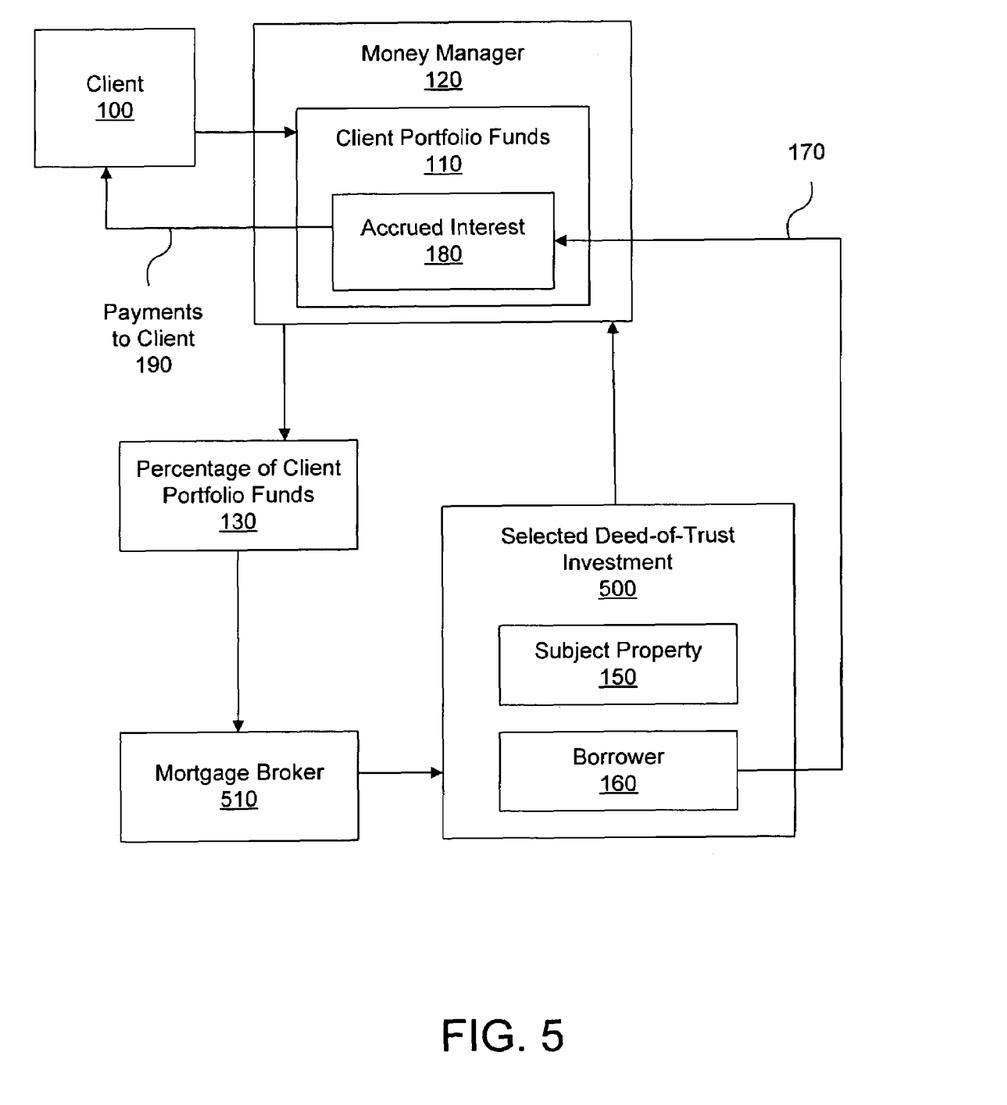
FIG. 5 is a schematic block diagram depicting one embodiment of a method for the involvement of a mortgage broker in the Fixed Income Advantage Method.

FIG. 5 is a schematic block diagram depicting one embodiment of a method for the involvement of a mortgage broker in the Fixed Income Advantage Method. The client 100 deposits the client portfolio funds 110 with the money manager 120. The money manager 120 uses a portion of the client portfolio the funds 130 to purchase a deed-of trust 140 through a mortgage broker 500. The deed of trust investment comprises the subject property 150 and the borrower 160. The borrower 160 makes interest payment 170 to accrued interest 180 within the client portfolio funds 110. The client 100 receives payments 190.

Figure 6:
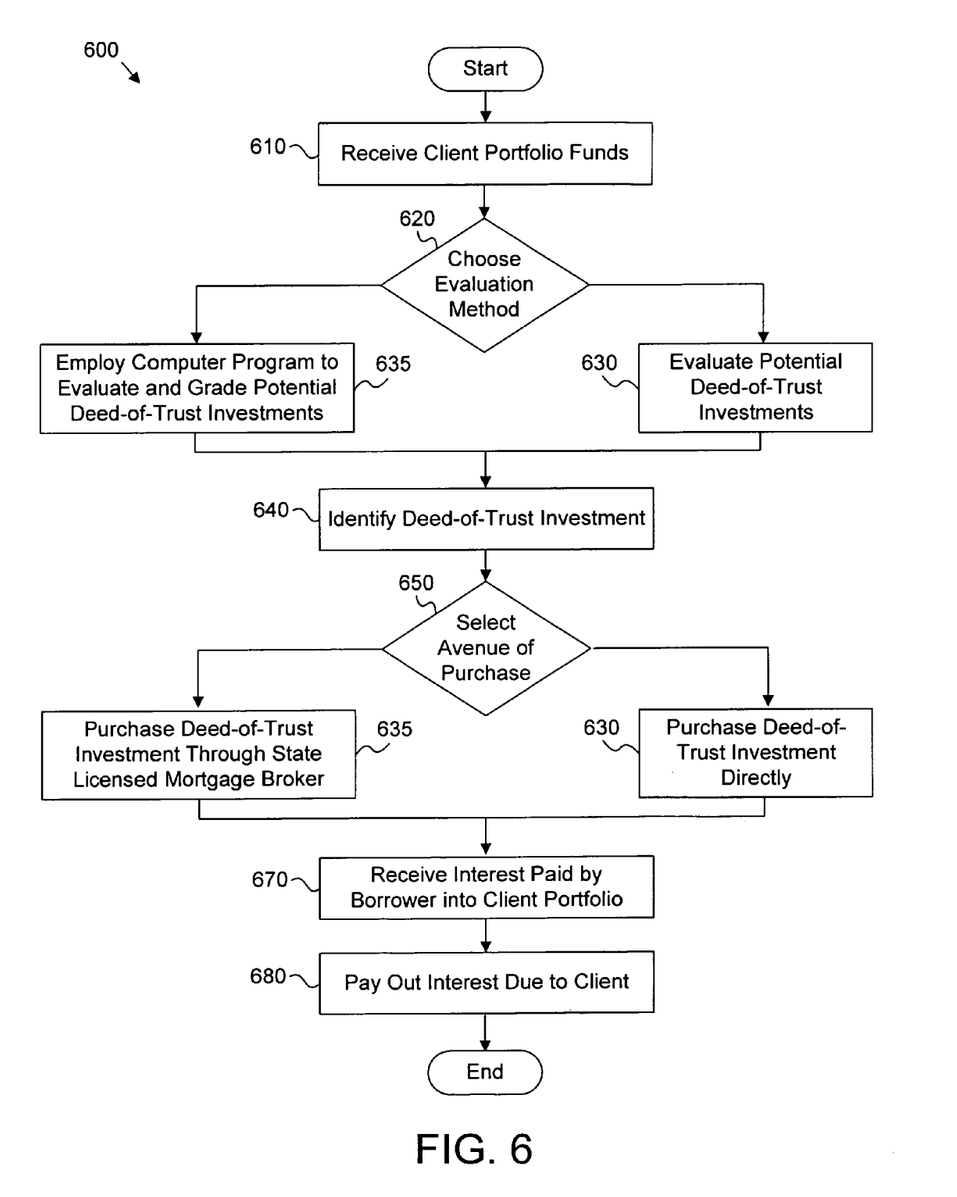
FIG. 6 is a flow chart depicting one embodiment of the steps that a registered investment advisor or money manager would take in applying embodiments of the Fixed Income Advantage method of the present invention.

FIG. 6 is a flow chart diagram depicting one embodiment of the steps taken by a money manager or investment advisor in applying embodiments of the method of the present invention. The money manager 120 first receives 610 the client portfolio funds 110. The money manager 120 then selects 620 an evaluation method for potential deed of trust investments 210. In one embodiment the money manager uses non-computer means to evaluate and grade 630 potential deed of trust investments. In a further embodiment the money manager employs a computer program to evaluate and grade 635 the potential investments. The money manager then identifies 640 a qualified deed of trust 140.

The money manager 120 next selects 650 the avenue of purchase for the deed of trust 140. For example, some states require that mortgage instruments such as deeds of trusts that are provided by institutional or investment lenders to the general public be handled or placed by a mortgage broker, 500. However, individual investors or their investment advisor can place loans directly to borrowers, as illustrated in some embodiments of present invention. In one embodiment the money manager purchases 660 the deed of trust 140 directly from the mortgagee or other vendor. In a further embodiment the money manager purchases 665 the deed of trust 140 through a state licensed mortgage broker 500. The money manager receives 670 interest 170 on the deed of trust 130 into the accrued interest portion 180 of the client portfolio 110 and then pays out 680 interest payment 190 to the client 100.

Figure 7:
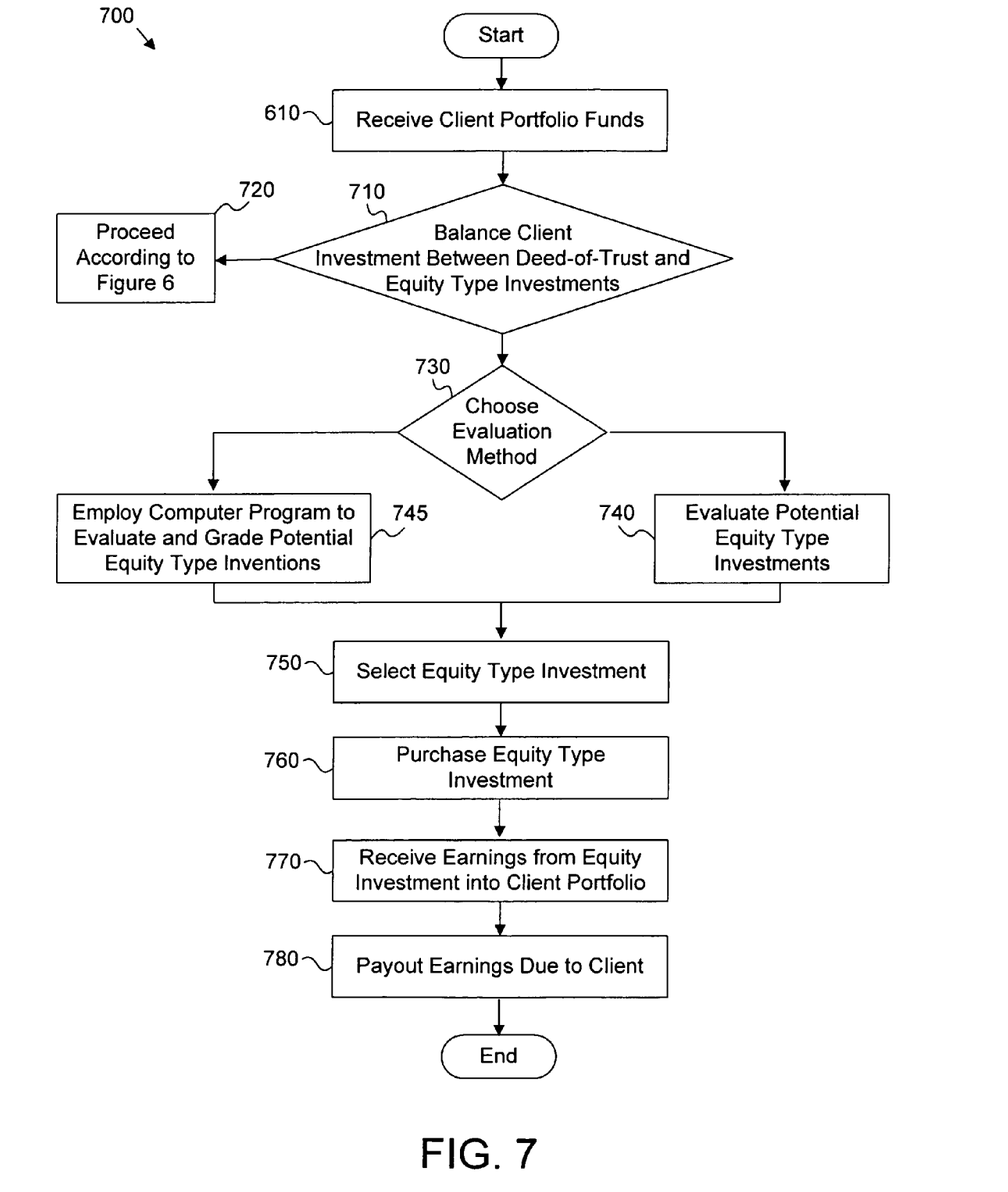
FIG. 7 is a flow chart depicting one embodiment of the steps that a registered investment advisor or money manager would take in applying embodiments of the Fixed Income Advantage method of the present invention in combination with equity type investment.

FIG. 7 is a flow chart diagram depicting further embodiments of applying the method of the present invention. The client 100 may desire to balance investments between fixed income and equity type investments. Consequently, in a further embodiment, the money manager 120 receives 610 client portfolio funds and then balances 710 the investment between deed of trust investments 140 and equity type investments 310. For the deed of trust investment the money manager proceeds 720 according to FIG. 6. For the equity type investment the money manager selects 730 an evaluation method for equity type investments. In one embodiment the money manager evaluates and grades 740 potential equity type investments 410 using non-computer means. In a further embodiment, the money manager employs 745 a computer program 400 to evaluate, and grade the potential investments 410. The money manager then identifies 750 the qualified equity type investment 310. Next the money manager 120 purchases 760 the selected equity type investment 310 using a portion of the client funds 300.

Following the purchase, the money manager receives 770 the earnings 320 from the equity type investment 310 into the accrued earnings portion 330 of the client portfolio 110 and pays out 780 earnings due 340 to the client 100.

Figure 8:
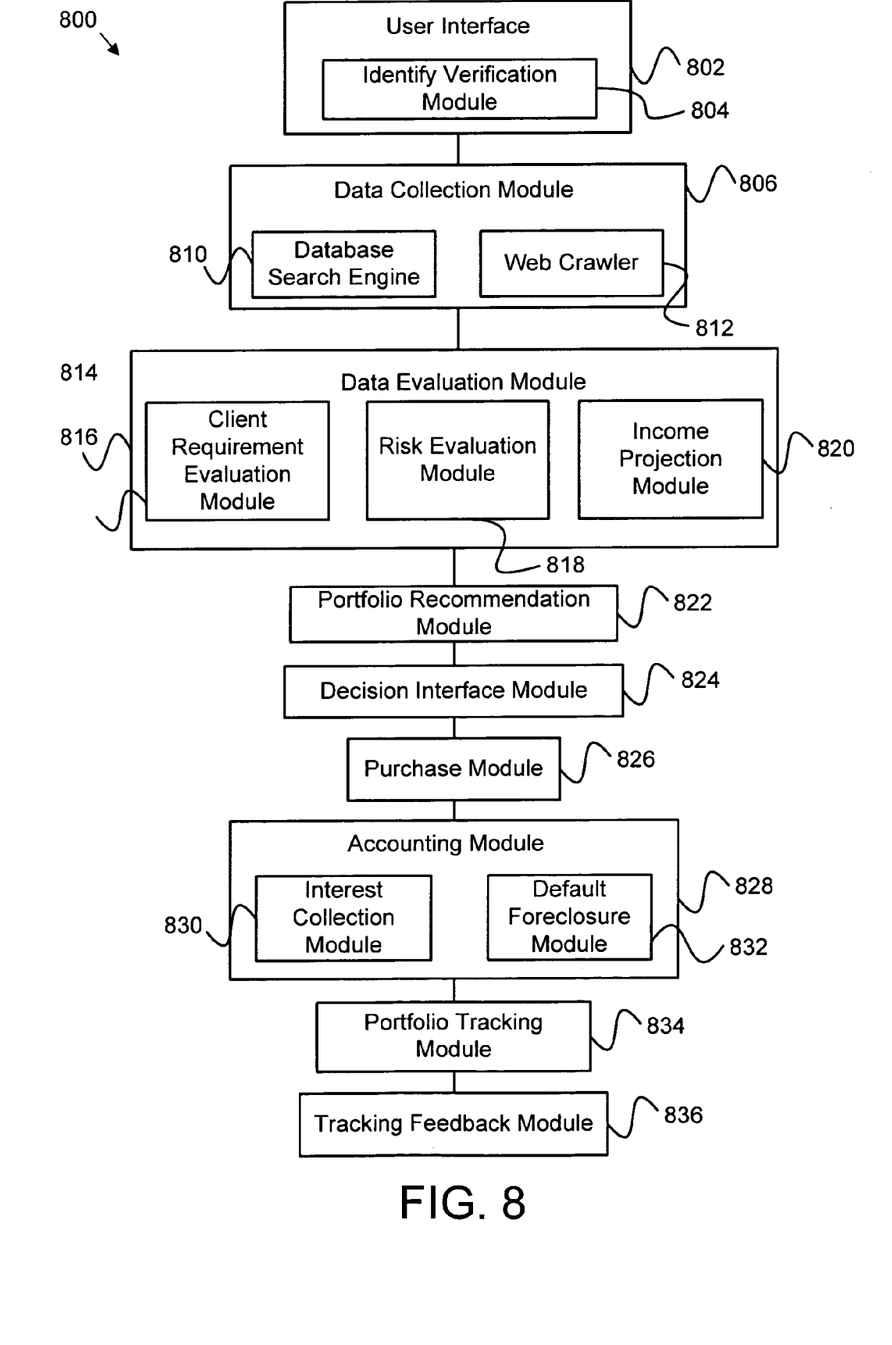
FIG. 8 is a schematic block diagram depicting one embodiment of an apparatus for investment using a deed of trust or mortgage instrument.

FIG. 8 is a schematic block diagram depicting one embodiment of an apparatus 800 for investment using a deed of trust or mortgage instrument. As depicted, the apparatus 800 comprises a user interface 802, an identity verification module 804, a data collection module 806, a database search module 808, a web crawler 810, a data evaluation module 814, a client requirement evaluation module 816, a risk evaluation module 818, an income projection module 820, a portfolio recommendation module 822, a decision interface 824, a purchasing module 816, an accounting module 828, an interest collection module 830, a default foreclosure module 832, a portfolio tracking module 834, and a tracking feedback module 836.

In the depicted embodiment the user may be a licensed financial professional, such as a money manager or federally registered investment advisor. The user interface 802 interacts with the user to request and accept information. The identity verification module 804 queries the user for a license number, password, or other unique identifier proving the registered or licensed status of the user. In a further embodiment the identifier may include a digital certificate evidencing the professional status of the user. The identity verification module 804 then verifies the user's identity. The verification may include matching with a list of registration or license numbers, verification of a password, or verification of a digital certificate. Upon successful verification the identity verification module 804 authorizes user access to the apparatus 800.

The data collection module 806 may collect client data supplied by the user, may search a database of loans secured by a real estate instrument of title, and may search the internet for other qualifying loans. The data collection module 806 may include a database search engine 810 and a web crawler 812. The data collection module 806 passes relevant data to the data evaluation module 814.

The data evaluation module 814 may include a client requirement evaluation module 816, a risk evaluation module 818, and an income projection module 820. In the depicted embodiment the modules comprise either standard or custom designed computer hardware and software. The data evaluation module 814 may incorporate prioritized gate arrays that order the sequence and weight of analysis. For example, if the client requirement evaluation module 816 indicates the client to be risk averse then the risk evaluation module 818 would pre-sort, rank, and even eliminate potential investments according to risk before passing the acceptable investments to the income potential module 820. If the client requirement evaluation module 818 indicates the client to be risk tolerant then the income potential module 820 would identify and rank the available investments according to income potential and pass the highest income investments to the risk evaluation module 818. In a further embodiment a user may pre-specify minimum acceptable income and maximum acceptable risk level.

The portfolio recommendation module 822 may receive evaluation information from the data evaluation module 814, formulate customized investment recommendations, and pass these to the decision interface module 824. The decision interface module 824 may interactively present the recommendations to the user and receive user input relative to the recommendations. The decision interface module 824 may further pass the approved purchase information to the purchase module 826. The purchase module 826 may be configured to issue a purchase order or other instrument to trigger the purchase of the approved investments. Upon completion of the purchase the purchase module 826 may pass the investment information to the accounting module 828.

The accounting module 828 may include an interest collection module 830 and a default foreclosure module 832. The interest collection module 830 is configured to manage interest payments from the portfolio investments. Such management may include electronic collection and banking of interest payments. The default foreclose module 832 would come into play only in the instance of a default on a portfolio loan. In such an event the foreclosure module 832 may trigger foreclosure on the real property securing the relevant loan.

The portfolio tracking module 834 is configured to monitor the performance of the portfolio investments. This may be done on a strictly objective basis or, in a further embodiment, in light of the client requirements. The portfolio tracking module 834 may pass information to the tracking feedback module 836, which may pass the information directly to the user through the user interface 802 or other avenue. In a further embodiment the tracking feedback module 836 may pass feedback information to the portfolio recommendation module 822. Basked on the tracking feedback the portfolio recommendation module 822 may generate new or revised recommendations.

Figure 9:
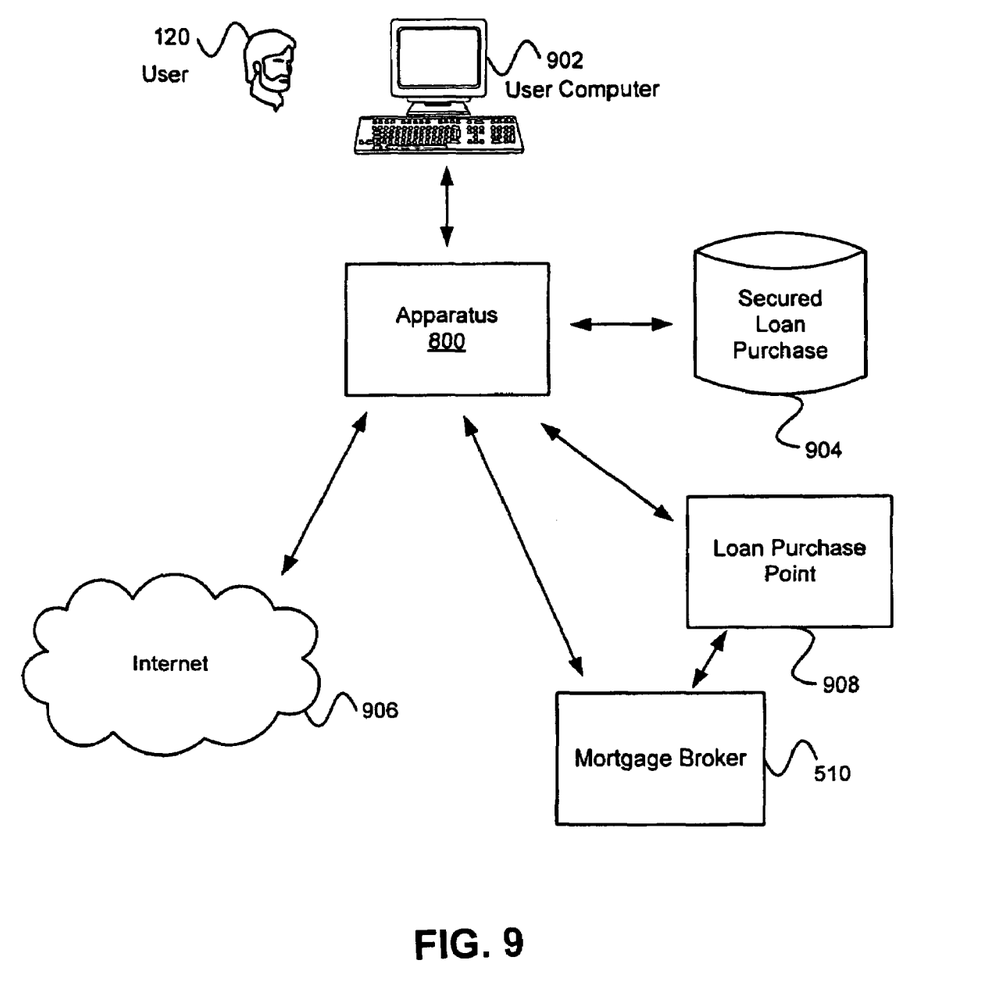
FIG. 9 is a schematic block diagram depicting one embodiment of a system for investment using a deed of trust or mortgage instrument.

FIG. 9 is a schematic block diagram depicting one embodiment of a system 900 for investment using a deed of trust or mortgage instrument. As depicted, the system 900 comprises a federally registered investment advisor, state licensed money manager or similar financial professional 120, a user computer 902, an apparatus 800 as elucidated in FIG. 8, a secured loan database 904, an internet 906, a loan purchase point 908, and a licensed mortgage broker 910. The financial professional 120 accesses the apparatus 800 through the user computer 902. The apparatus 800 accesses the secured loan database 904 and may also access the internet 906. Based on the available data the apparatus 800 formulates portfolio recommendations and presents these to the financial professional 120. The financial professional 120 returns investment decisions to the apparatus 800 through the user computer 902. Upon receiving the investment decisions the apparatus 800 triggers the appropriate loan purchase at the loan purchase point 908. Alternatively, as required in some states, the purchase may be made through a state licensed mortgage broker 510.

Figure 10A:
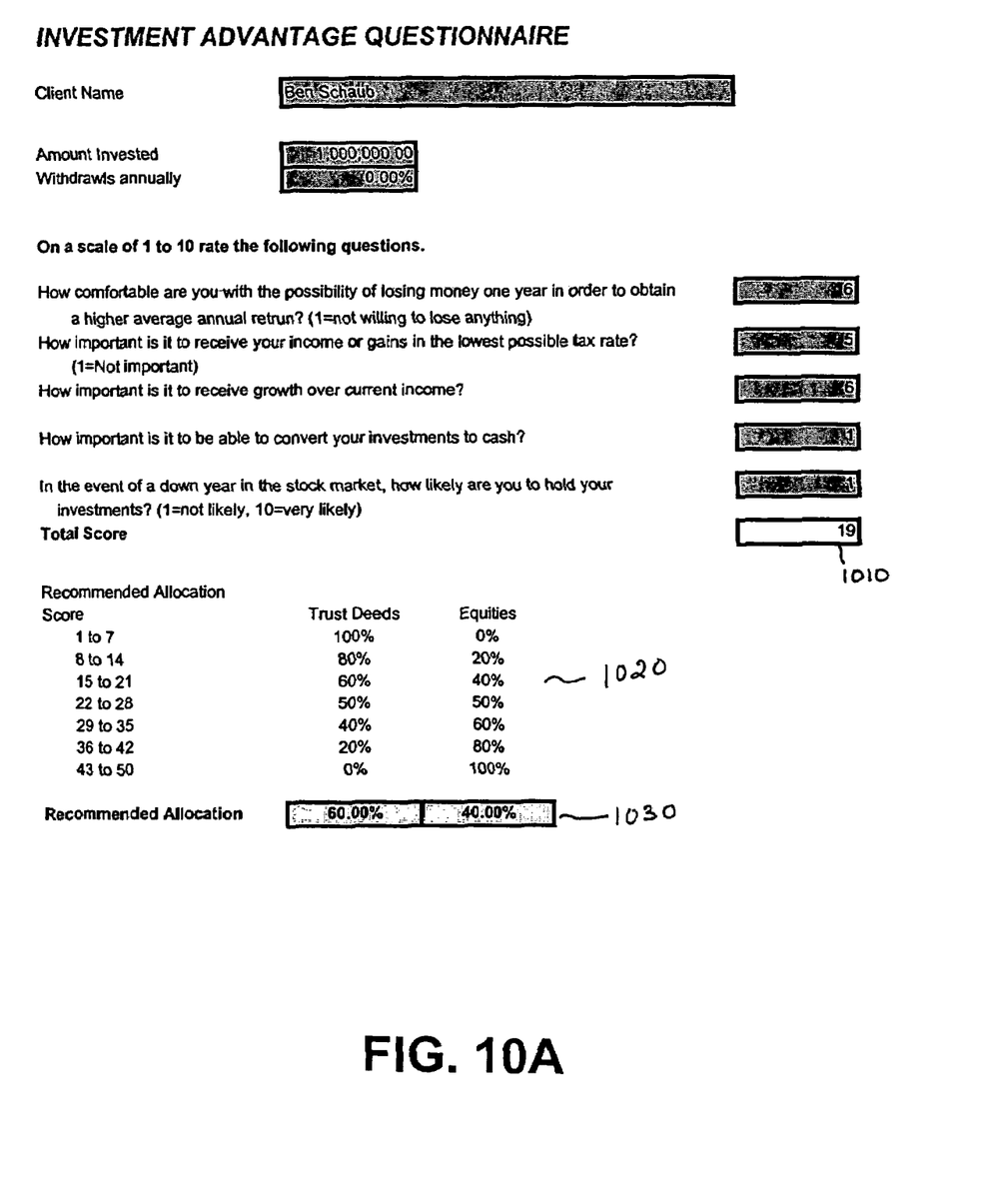
FIG. 10 is a numerical illustration of one embodiment of an investment analysis system according to the present invention.

FIG. 10 is a numerical illustration of one embodiment of an investment analysis system 1000 according to the present invention. As depicted, the analysis system 1000 includes a client questionnaire 10A, a trust deed allocation estimate ("TD") 10B, an equity allocation estimate ("EQ") 10C, and combined expectations values 10D.

In the depicted embodiment the certified financial professional interacts with the client to fill out the client questionnaire 10A, and enters the information into an electronic analysis protocol such as system 900 or apparatus 800. Analysis of the client's answers to the questions generates an allocation score 1010. An allocation table 1020 ties consecutive ranges of scores to percentage allocation of investment between fixed income and equity investments. The investment analysis system 1000 generates an individualized recommended allocation 1030.

The TD 10B illustrates electronically projected future values of the trust deed investment. The EQ 10C illustrates electronically projected future values of equity investment. The combined expectations values 10D illustrated electronically projected future values of the individualized allocation recommended for the client. The combined expectation values also projects income comparisons between the recommended allocation according to the Investment Advantage system and other standard investment vehicles such as Dow Jones and S&P 500.

What is claimed is:

1. An apparatus for investment using a deed of trust instrument, the apparatus comprising:
    a storage device storing executable code for a computer;
    a processor executing the executable code for the computer, the executable code comprising
        a financial license verification module interface verifying a government issued credential of a financial professional;
        a data collection module accessing and storing investment data on trust deed loan investments and equity investments;
        a client evaluation module generating a plurality of risk question scores from client answers to a plurality of risk questions, the risk questions consisting of a question on comfort of a client with the possibility of losing money one year in order to obtain a higher average annual return, a question on an importance of receiving income or gains in a lowest possible tax rate, a question on an importance of growth over current income, a question on an importance of being able to convert client investments to cash, and a question on holding investments during a down year, scoring the risk questions from one to ten with one indicating risk aversion, and generating recommended allocations for the trust deed loan investments and the equity investments based on the risk question scores by summing the risk question scores and calculating the recommended allocation to trust deed loan investments as 100% for a risk question score sum of 1 to 7, 80% for a risk question score sum of 8 to 14, 60% for a risk question score sum of 15 to 21, 50% for a risk question score sum of 22 to 28, 40% for a score of 29 to 35, 20% for a risk question score sum of 36 to 42, and 0% for a risk question score sum of 43 to 50, wherein recommended allocation to equity investments is calculated as 100% minus the recommended allocation to trust deed loan investments;
        an income potential module eliminating trust deed loan investments and equity investments according to risk based on the risk question scores and ranking the remaining acceptable trust deed loan investments and equity investments by income potential; and
        a data evaluation module comparing and evaluating returns from the trust deed loan investments and the equity investments using the recommended allocations.

2. The apparatus of claim 1, wherein the financial license verification module comprises a digital certificate.

3. The apparatus of claim 1, wherein the data collection module further comprises at least one of a database search module and an internet crawler.

4. The apparatus of claim 1, wherein the data collection module further accesses and stores client data.

5. The apparatus of claim 1, further comprising a portfolio recommendation module providing investment recommendations based on the output of the data evaluation module.

6. The apparatus of claim 1, further comprising a decision interface presenting the investment recommendations to a user and receiving user input.

7. The apparatus of claim 1, further comprising a purchase module triggering a purchase of a selected investment instrument.

8. The apparatus of claim 1, further comprising an accounting module receiving investment information.

9. The apparatus of claim 1, wherein the accounting module further comprises an interest collection module collecting interest generated by the purchased investment instrument and a default foreclosure module triggering foreclosure in event of default.

10. The apparatus of claim 5, further comprising a portfolio tracking module tracking performance of investment instruments within a portfolio.

11. The apparatus of claim 10, further comprising a tracking feedback module inputting portfolio performance to the portfolio recommendation module.

12. A method for investment using a deed of trust instrument, the method comprising:
- verifying a government issued credential of a financial professional;
- accessing and storing investment data on trust deed loan investments and equity investments;
- generating, by use of a computer, a plurality of risk question scores from client answers to a plurality of risk questions, the risk questions consisting of a question on comfort of a client with the possibility of losing money one year in order to obtain a higher average annual return, a question on an importance of receiving income or gains in a lowest possible tax rate, a question on an importance of growth over current income, a question on an importance of being able to convert client investments to cash, and a question on holding investments during a down year;
- scoring the risk question scores from one to ten with one indicating risk aversion;
- summing the risk question scores;
- generating, by use of the computer, recommended allocations for the trust deed loan investments and the equity investments based on the risk question scores by calculating the recommended allocation to trust deed loan investments as 100% for a risk question score sum of 1 to 7, 80% for a risk question score sum of 8 to 14, 60% for a risk question score sum of 15 to 21, 50% for a risk question score sum of 22 to 28, 40% for a risk question score sum of 29 to 35, 20% for a risk question score sum of 36 to 42, and 0% for a risk question score sum of 43 to 50, wherein recommended allocation to equity investments is calculated as 100% minus the recommended allocation to trust deed loan investments;
- eliminating trust deed loan investments and equity investments according to risk based on the risk question scores;
- ranking the remaining acceptable trust deed loan investments and equity investments by income potential; and
- comparing and evaluating returns from the trust deed loan investments and the equity investments using the recommended allocations.

* * * * *